No. 610,651. Patented Sept. 13, 1898.
E. HUBER.
LIFTING JACK.
(Application filed Feb. 18, 1898.)
(No Model.)
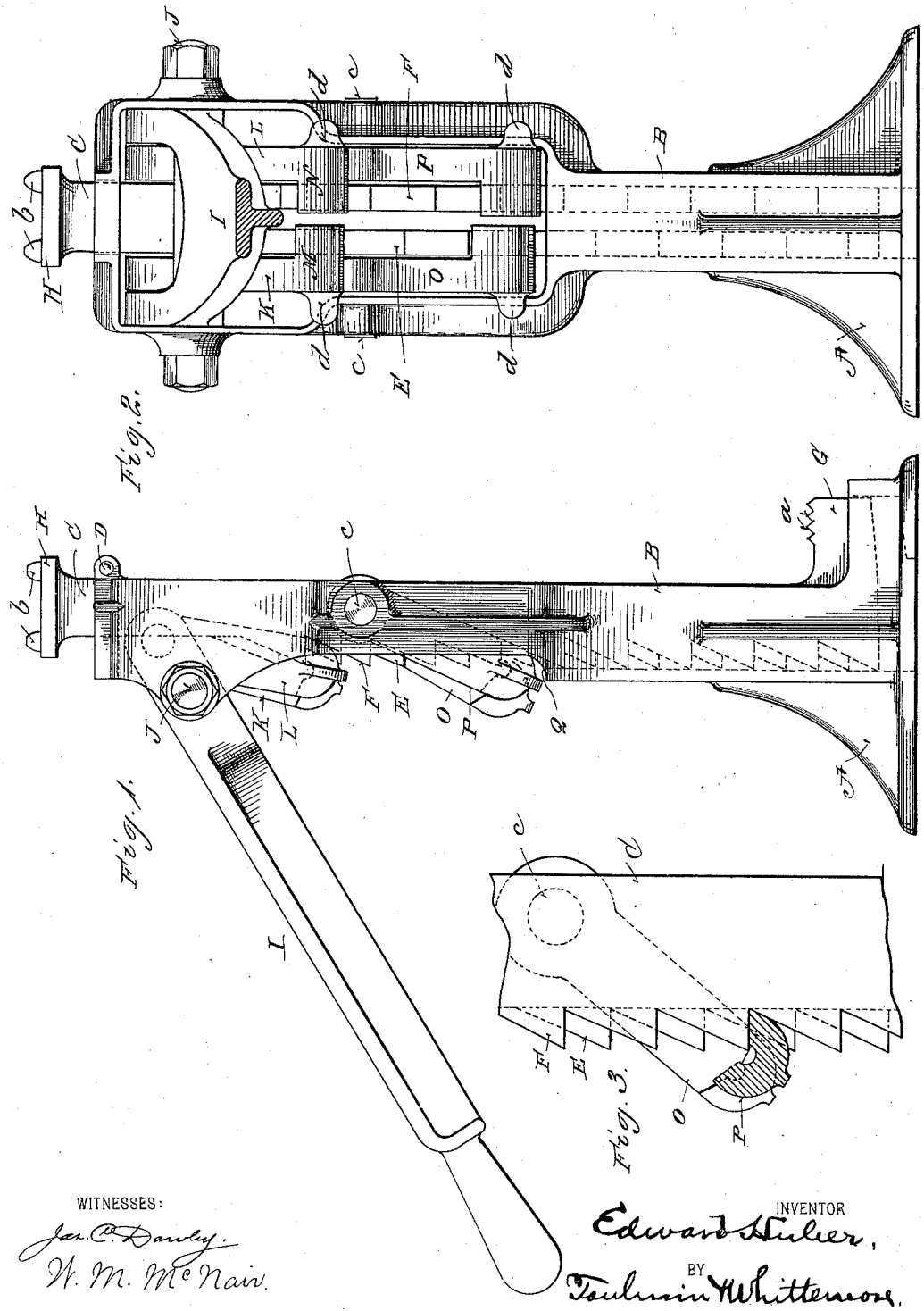
WITNESSES:
Jas. C. Dawley.
W. M. McNair.
INVENTOR
Edward Huber,
BY
Toulmin Whittemore,
ATTORNEYS

United States Patent Office.

EDWARD HUBER, OF MARION, OHIO.

LIFTING-JACK.

SPECIFICATION forming part of Letters Patent No. 610,651, dated September 13, 1898.

Application filed February 18, 1898. Serial No. 670,779. (No model.)

*To all whom it may concern:*

Be it known that I, EDWARD HUBER, a citizen of the United States, residing at Marion, in the county of Marion and State of Ohio, have invented certain new and useful Improvements in Lifting-Jacks, of which the following is a specification, reference being had therein to the accompanying drawings.

My invention relates to certain new and useful improvements in lifting-jacks.

The object of my invention is to provide a set of lifting and a set of holding pawls and a lifting-bar having two sets of teeth, the teeth of one set being out of line with the teeth of the other set, whereby the teeth in each set may be of such size as to give ample strength and at the same time permit the lifting-bar to be operated or raised short distances, such arrangement permitting one lifting-pawl and one supporting-pawl to be operated in conjunction with one set of teeth at one time and the other lifting-pawl and the other supporting-pawl to operate in conjunction with the other set at intermediate times, while the lifting-pawls are the same relative length and the supporting-pawls are the same relative length.

My invention also relates to details of construction hereinafter described, and particularly pointed out in the claims.

In the accompanying drawings, on which like reference-letters indicate corresponding parts, Figure 1 is a side elevation of my improved jack; Fig. 2, a front elevation of the same with the operating-lever in section. Fig. 3 is a detail view with parts in section.

The letter A represents a suitable base, to which is cast or otherwise secured a casing or shell B. Within this shell or casing is placed a lifting-bar C, held in said casing in any suitable manner, such as by a bolt D. This lifting-bar C has a double set of teeth E and F, respectively. It will be seen that the teeth of the set E are in advance of the teeth in the set F. As illustrated in the drawings the teeth of one set are about half-way between the teeth of the other set, for the purpose hereinafter appearing. The lower end of this lifting-bar C is turned outward at substantially a right angle, as shown at G. This turned-out portion G has a roughened upper surface, as shown at a, whereby objects to be raised are prevented from slipping off of said turned-out portion, as will presently appear. Upon the upper end of said lifting-bar is cast or otherwise secured a cap-plate H, having projections b extending from its upper surface, which are also adapted to prevent objects to be raised from slipping or sliding off of the jack, when the head H of the lifting-bar can be placed beneath the object to be lifted. In order to slide the lifting-bar within the casing, I have provided a lever I, pivoted at J to the casing B near its upper end. To the inner end of this lever I attach lifting-pawls K and L, between which the lifting-bar C fits. These pawls are turned in or toward each other at their lower ends, as shown at M and N and such extensions form lugs which engage with the respective sets of teeth E and F, showing through the opening Q in the casing B in full lines. When the outer end of the lever I is pressed down, the pawl in engagement with one of the teeth of one set of teeth will cause the lifting-bar to be raised. As soon as said lifting-bar is raised a sufficient distance it is held by one or the other of the stop-pawls O and P, pivotally attached to the shell or casing, as shown at c. As soon as one of the pawls engages with a tooth of one of the sets of teeth, which I term "jack-teeth," the lever may be raised and the other lifting-pawl will engage a tooth of the other set of jack-teeth, and when the lifting-bar is raised far enough the second stop-pawl will engage a tooth of the other set of jack-teeth. Thus it will be seen that with my invention one set of lift and stop pawls are brought into operation at one time and the lift and stop pawls of the other set at another time, and so on alternately. With this construction I am enabled to provide a much larger and stronger tooth and at the same time move the lifting-bar but a short distance at each down movement of the lever. This is of great practical importance, especially when lifting very heavy loads. Where the object to be lifted is not sufficiently high to permit the head H of the lifting-bar to be placed beneath it, the extension G of said bar is used; but it will be understood that the operation of the device is the same in either case. When it is desired to set the lifting-bar to its lower position, the lifting and stop pawls are released from engagement with the jack-teeth by taking hold of the extensions $d$, projecting from each side of said pawls, as clearly shown in Fig. 2, and raising said pawls from engagement with the teeth. This will permit the lifting-bar to drop to its lowermost position.

Having thus fully described my invention, what I claim as new, and desire to secure by Letters Patent, is—

1. In a lifting-jack, the combination, with a shell or casing a lifting-bar having a double set of jack-teeth mounted therein and adapted to be raised within said shell or casing, a set of lifting-pawls for raising said lifting-bar, and a set of holding-pawls, one of said lifting-pawls acting at one time and one at another, one of the lifting-pawls and one of the holding-pawls operating together at one movement and the other lifting and holding pawls operating together at another movement.

2. In a lifting-jack, the combination with a shell or casing having a lifting-lever pivoted thereto, and also holding-pawls pivoted thereto, lifting-pawls carried by said lever at one side of its axis, said holding-pawls being also composed of a set, of a lifting-bar having a double set of jack-teeth thereon, one set being in advance of the other set, one of said sets being adapted to be engaged by one lifting and one supporting pawl at one movement and the other set to be engaged by the other holding and lifting pawl at another movement.

3. In a lifting-jack, the combination with a shell or casing, and a pair of holding-pawls pivoted thereto and having engaging lugs in the same horizontal plane, said pawls swinging downward on their pivots, of a lever pivoted to said shell or casing, a pair of swinging lifting-pawls pivoted to said lever at one side of its fulcrum and having engaging lugs in the same horizontal plane, and a lifting-bar slidingly mounted in said shell or casing and provided at one side with a double set of teeth alternating in position, one set of said teeth being adapted to be engaged at one movement by one lifting-pawl and one holding-pawl, and the other set of said teeth being adapted to be engaged at one movement by the other lifting-pawl and the other holding-pawl, said engagements being made by the engaging lugs.

In testimony whereof I affix my signature in presence of two witnesses.

EDWARD HUBER.

Witnesses:
 JOHN J. CRAWLEY,
 ROSTEN CURTIS.